United States Patent [19]

Ashihara et al.

[11] Patent Number: 5,349,022
[45] Date of Patent: Sep. 20, 1994

[54] MANUFACTURE OF THE EMULSION OF SYNTHETIC RESIN COMPOSITES

[75] Inventors: Teruaki Ashihara; Shingo Tone; Toshimitsu Saito; Ryozo Orita, all of Takasago, Japan

[73] Assignee: Toyo Kasei Kogyo Company Limited, Osaka, Japan

[21] Appl. No.: 847,307

[22] Filed: Mar. 6, 1992

[30] Foreign Application Priority Data

Mar. 27, 1991 [JP] Japan ................... 3-106334

[51] Int. Cl.$^5$ ................... C08K 3/26; C08L 13/02
[52] U.S. Cl. ................... 524/414; 524/458; 524/460; 524/423; 524/425
[58] Field of Search ........... 524/458, 460, 501, 35, 524/37, 47, 459, 423, 425, 414

[56] References Cited

U.S. PATENT DOCUMENTS 4,981,730  1/1991  Zaleski ................... 524/525

FOREIGN PATENT DOCUMENTS 56-161416 12/1981 Japan .
58-005371  1/1983 Japan .
62-095372  5/1987 Japan .
62-250027 10/1987 Japan .
01256556 10/1989 Japan .

Primary Examiner—Joseph L. Schofer
Assistant Examiner—Jeffrey T. Smith
Attorney, Agent, or Firm—Wenderoth, Lind & Ponack

[57] ABSTRACT

Non-organic solvent, non-polluting and stable emulsions of modified chlorinated polyolefins are prepared by dissolving chlorinated polyolefins and oligomers of a (metha)acrylate system uniformly in a (metha)acrylate monomer in the presence or absence of catalyst or chain transfer moderator, and suspension polymerization is achieved in an aqueous solvent. The obtained suspensions are stable more than 3 months at room temperature, and these emulsions give one coat coating films and primer coating films which have good properties such as good adhesion, and waterproof and weatherproof properties.

4 Claims, No Drawings

MANUFACTURE OF THE EMULSION OF SYNTHETIC RESIN COMPOSITES

BACKGROUND OF THE INVENTION (1) Field of the Invention

The present invention relates to polyolefin resin composites, for example polypropylene homopolymer, ethylene propylene copolymer, ethylene propylenediene copolymer etc. for use as coatings, and more precisely the present invention concerns the manufacture of plastic resin composites which give a good adhesive property, weatherproof property, solventproof property and good appearance of the coated films thereof to moldings or film applied as a primer or one-shot finishing.

(2) Description of the Prior Art

Formerly, according to the modification with acrylate or methacrylate [abbreviated as (metha)acrylate] of chlorinated polyolefin, there are the methods of the modification of the polyolefins in organic solvents (published unexamined Patent Application No. 95372/1987 and No. 250087/1987) and moreover the applicants of the present invention already developed the technique to neutralize in water and to emulsify the chlorinated polyolefin after modifying them by the (metha)acrylate in the organic solvent (published unexamined Patent Application No. 256556/1989). And, on the other hand, to the high chlorinated polyolefins, which are chlorinated up to 60~70 weight %, there is added an aqueous solution containing dispersing agents, and after dissolving the polyolefin in the (metha)acrylic monomer, suspension polymerization is achieved.

SUMMARY OF THE INVENTION

There are underscribed 3 points to be improved in the above described invention of the unexamined Patent Application No. 95372 (1987) and No. 250087 (1987):

(1) It is necessary to regulate the exothermic reaction because the temperature is increased when the chlorinated polyolefin polymerizes with the (metha) acrylic monomers.

(2) The organic solvents such as toluene or xylene are not desirable from the viewpoint of environmental safety because these organic solvents accumulate in the human body when they are used as spray coatings.

(3) The vapors of the above organic solvents raise substantial trouble in terms of air pollution.

And the invention of the unexamined Patent Application No. 256556/1989 of the present applicant cannot wholly satisfy the condition of being pollution free.

Moreover, in the invention of the published unexamined Patent Application No. 161416 (1983), which concerns high chlorinated polyolefin compounds, chemical affinity of the high chlorinated polyolefins for (metha)acrylate acid is better, but when the high chlorinated polyolefins are used as the coatings, dehydrochlorination occurs and there is a danger of rusting the neighboring metal portion, and air pollution occurs when the coated materials are scrapped. The present invention achieves the following (A)~(C) objects by solving the above described various problems of the synthetic resin coating composites heretofore in use.

The objects are:

(A) Synthesis of water emulsion of stable modified chlorinated polyolefin resin compositions containing no solvent and freed from contamination.

(B) Good adhesiveness to a polypropylene substrate.

(C) Manufacture of the emulsion of the modified polyolefin resin composites for use in producing good weatherproof coatings.

DETAILED DESCRIPTION OF THE INVENTION

The inventors of the present invention studied eagerly to solve the above mentioned problems, and to attain the object of the present invention, and at last they accomplished the present invention. The present invention is characterized by manufacturing the emulsion of the resin composites in the presence or absence of catalysts and chain transfer agents by polymerizing under described (A)~(C) reagents in a water medium.

(A) Chlorinated polyolefins containing 5~70 weight % of chlorine.

(B) One or plural numbers of (metha)acrylate monomers which is possible to dissolve (A).

(C) (metha) acrylic oligomers.

Namely, the present invention is that the (metha)acrylic oligomers (C) and the chlorinated polyolefins (A) are dissolved in the acrylic monomers (B) and after dispersing equally in the water medium, suspension polymerization is carried out, and there are obtained good water emulsions and at the same time, it is found that these water emulsions indicate various good physical properties such as good adhesive and weatherproof properties for the polyolefin resins. The polarity of the low chlorinated polyolefin solids is very low compared with the polarity of (metha)acrylic polymer, e.g. methyl (metha)acrylate, and consequently after the chlorinated polyolefins are dissolved in the (metha)acrylate monomer, in the case when the emulsion polymerization or suspension polymerization in the water medium is carried out, stable and uniform emulsions cannot be obtained because the above 2 polymers repel each other.

However, both of the above components which repel each other can be reacted smoothly without coalescence from the beginning of polymerization to the end of the reaction when both components are made compatible. The methods of making both components compatible are as follows:

(1) The components which are not compatible are stabilized by graft polymerization.

(2) The system is stabilized by adding compatibilizing agents.

However, the present invention intends to achieve the above (1) and (2) methods at the same time in order to achieve the compatibility of both the components. That is to say, by the selection of (metha)acrylic oligomers which are compatible with both the (metha)acrylic polymer and the low chlorinated polyolefins in the case when the chlorinated polyolefins (A) are copolymerized with the (metha)acrylic monomer (B), acrylic oligomers are introduced to the side chain portion of the graft copolymerizing compounds, and by the side chain portions, the (metha)acrylic polymers are liable to be compatible with the low chlorinated polyolefins. Chlorinated polyolefins (A) used in the present invention are the components which give the adhesiveness to the coating properties and the components (A) contain 5~70 weight % chlorine, preferably 10~60 weight % chlorine, and more preferably 20~50 weight %. When the chlorine content of (A) is lower than 5 weight %, stability of the solution of (A) is inferior under lower temperature, and the appearance of the coated film is lessened.

As the raw material of the chlorinated polyolefin used in the present invention, there are the crystalline chlorinated polyolefin, non-crystalline chlorinated polypropylene, polybutene, low density polyethylene, high density polyethylene, ethylene-propylene copolymer, ethylene-propylene-diene copolymer, ethylene-vinylacetate-copolymer etc., and moreover there are used in the present invention modified polyolefin resins in which there are introduced to the chlorinated polyolefin, carboxyl, hydroxyl and acid anhydride radical etc. Chlorination of the polyolefin is made easily by the ordinary reaction method.

For example, polypropylene is dissolved in chlorohydrocarbon such as carbon tetrachloride and chlorine gas is introduced while adding or not adding catalyst or under UV-irradiation, under pressure or normal pressure, at a temperature range of normal temperature to 130° C. The chlorinated polyolefins (A) include the modified chlorinated polyolefin modified by the maleic acid anhydride, and the modification is carried out by the known method. For example, as above described, chlorinated solvent is replaced with another solvent, e.g. aromatic hydrocarbon, especially toluene solution, and maleic anhydride is added to the chlorinated polyolefin at the temperature of 70°~120° C. and the components are reacted in the presence or absence of catalyst, and further the presence or absence of the third ingredient.

It is confirmed that the adhesion and solvent resistance are raised in the present invention by using modified chlorinated polyolefin modified by the maleic acid anhydride. The (metha)acrylic monomers (B) used in the present invention are selected preferentially from the materials which are easy to dissolve the chlorinated polyolefin (A) or (metha)acrylic oligomers (B), for example monofunctional (metha)acrylate, i.e. methyl(metha)acrylate, ethyl(metha)acrylate, isobutyl(metha)acrylate, normal butyl(metha)acrylate, 2-ethyl hexyl(metha)acrylate, lauryl(metha)acrylate, stearyl(metha)acrylate, benzyl(metha)acrylate, isobornyl(metha)acrylate or the monofunctional monomers containing carboxyl radical or acid anhydride radical, e.g. maleic acid anhydride, acrylic acid methacrylic acid or dimethylaminoethyl(metha)acrylate, 2-hydroxylethyl(metha)acrylate, glycidyl(metha)acrylate, monofunctional (metha)acrylates having the functional radical of acrylamide radical etc. or one or plural number of monomers selected from the following styrenes are used individually or mixed, i.e. styrene, chlorostyrene, α-methylstyrene etc. The (metha)acrylic oligomers (C) used in the present invention are characterized in that the compounds have a definite repeating unit and at the lowest one or two double bonds in the molecule, and of course among the said compounds macromer or macromonomer are included. Ordinary macromer or macromonomer (abbreviated as macromonomers) are indicated which have the double bond at the terminal of the molecule, but in the present invention, are included the compounds which have the functional radicals such as hydroxyl or carboxyl radical at both terminals of the molecules. These macromonomers have a molecular weight from several hundreds to ten thousands. And the properties of the obtained coating films and the stability of the emulsions are dissimilar by the kind and molecular weight of the macromonomers.

As the above described (metha)acrylic oligomers (C) there are listed, e.g. caprolactone modified (metha)acrylate oligomers, (metha)acrylate oligomers having the hydroxyl radical at the terminal of the molecule, oligoester(metha)acrylate urethane(metha)acrylate, epoxy(metha)acrylate etc. and the functional radicals such as hydroxyl or carboxyl, acid anhydride or amino radical are included in the above-named compounds. Copolymerization reaction of the chlorinated polyolefins (A), (metha)acrylic monomers (B) and (metha)acrylic oligomers (C) is a suspension polymerization reaction.

The dispersing agents used in said reaction are natural high polymers and their derivatives, e.g. gelatin, traganthgum, starch, methylcellulose, carboxylmethylcellulose, hydroxylpropylcellulose, hydroxyethylcellulose, hydroxylmethylcellulose and water soluble synthetic organic high polymers, e.g. polyvinylalcohol, partially saponified polyvinylalcohol, polyvinylalcohol copolymers, polyacrylic acid salts, and the minute powders of inorganic compounds and their mixture which are slightly soluble in water, e.g. $BaSO_4$, $CaSO_4$ $BaCO_3$, $CaCO_3$, $MgCO_3$, $CaPO_4$ etc. and talc, bentonite, silicic acid, diatomite, clay and other inorganic high polymers and metal, metal powder and metal oxide powder.

According to the research of the inventors of the present invention, above mentioned dispersing agents have the effect to prevent one droplet from uniting with another droplet. Namely, in the case when the droplet in the monomer solution will collide with another droplet, the droplet collides with the dispersing agent dispersed in water and so the collision of the droplet with the other droplet is prevented. Before going into the above mentioned suspension polymerization, it is necessary to make the above mentioned droplets uniform and fine particles using the above mentioned dispersing agents. In such a case, it is easy to attain the object by using an emulsifier together with the dispersing agent or by using a homogenizer. It is confirmed that the reason why the emulsifier is used is that the emulsifiers have a large ability to lower the surface tension of the solution and thus have the ability to minimize the droplets more and more similar to the dispersing agent, and have the effect to prevent coalescence of the droplets.

Emulsifiers or surface active agents used in the present invention are the aromatic compound system such as polyoxyethylene alkylphenyl ether, the higher alcohol system such as polyoxyethylene alkyl ether and nonionic surface active agents of typical fatty acid derivatives such as polyoxyethylene fatty acid ester etc. and anionic surface active agents such as sulfuric acid ester salt of polyoxyethylene alkyl or alkylphenyl ether, sodium salt of dialkylsulfosuccinic acid ester, and Na-salt of higher alcohol sulfonic acid ester.

It is possible to use together one or plural numbers of surface active agents above mentioned. And good results are obtained preferably by using together the anionic and the nonionic surface active agents which have respectively different HLB values.

As the polymerizing initiator used in the polymerization, the peroxide system, i.e. benzoylperoxide, or the azobis system, i.e. azobisisobutyronitrile, are used mainly. And moreover, in order to control the polymerization degree, chain transfer moderators are used, and the chain transfer moderators have the effect to lower the polymerization degree largely, and make the chain length uniform. As the chain transfer moderators, mercaptan or disulfide classes are used. As the mercaptan class, there are n-dodecyl mercaptan, n-tetradecyl mercaptan, n-decyl mercaptan, t-decyl mercaptan, t-tetradecyl mercaptan, t-hexadecyl mercaptan, 3-ethoxypropane, thiol etc. As the disulfide class, there are bis-2-aminodiphenyl disulfide, bis-2-benzothiazoyl disulfide, diisopropylxanthogen disulfide. As to the method of polymerization, the solution of chlorinated polyolefin (A) which dissolves the polymerizing initiator, (metha)-acrylic monomer (B) and (metha)acrylic oligomer (C) and the emulsion of homogenized water solution of the dispersing agent and the emulsifier (abbreviated these are named as preemulsion) are added dropwise to the reaction vessel containing deionized water and polymerized by stirring in a nitrogen atmosphere.

EXAMPLES

EXAMPLE 1

| | |
|---|---|
| 2-ethylhexylmethacrylate: | 465 g |
| Macromonomer-AW-6S: | 220 g |
| (manufactured by TOA GOSEI KAGAKU KOGYO, 50% toluene solution) | |
| Chlorinated polypropylene: | 200 g |
| (manufactured by TOYO KASEI KOGYO CO., LTD. HARDLEN 14-LWP, Cl-content 27%) | |

Above 3 main raw materials are put in a 4-necked flask and after dissolving them to a uniform solution at 80° C., an adaptor and condenser are set to the vessel to remove the contained toluene, and the toluene is all removed under reduced pressure using water aspirator and the solution is cooled to the room temperature and the underscribed (1)~(3) are added to the above solution:

| | |
|---|---|
| (1) Methacrylic acid | 17 g |
| (2) Niper BO (Benzyl peride paste) | 11 g |
| (Manufactured by NIHON YUSHI CO., LTD.) | |
| (3) t-dodecylmercaptan | 0.7 g | to obtain uniform solution (a). The following (1)~(5) reagents are separately measured:

| | |
|---|---|
| (1) Deionized water | 1,300 g |
| (2) KURARE Poval 21722 (polyvinyl alcohol) | 54 g |
| (Manufactured by KURARE CO., LTD.) | |
| (3) NISSO HPC-SL (Hydroxy propyl cellulose) | 8 g |
| (Manufactured by NIHON SODA CO., LTD.) | |
| (4) Neocall-P (Anion surface active agent) | 15 g |
| (Manufactured by DAIICHI KOGYO SEIYAKU CO., LTD.) | |
| (5) Noigen EA-190D (Nonion surface active agent) | 33 g |
| (Manufactured by DAIICHI KOGYO SEIYAKU CO., LTD.) | |

Above (1)~(5) reagents are put in a vessel to obtain uniform and transparent water solution (b). The solutions (a) and (b) are put in a 5 l polyethylene cup and are dispersed uniformly by using a 2000 r.p.m. Homogenizer HV-SL (manufactured by TOKUSHU KIKA KOGYO CO., LTD.) for 30 minutes and are filtered by a wire gauge (made from #400 SUS) to obtain a preemulsion. 200 g deionized water are added into a 2 l 4-necked flask equipped with dropping funnel which contains the above mentioned preemulsion and after the air in the system is replaced with $N_2$ and the temperature of the system is raised to 63° C. by using an oil bath while the system is stirred, the preemulsion in the dropping funnel is dropped uniformly into the necked flask and reacted for 3 hours and is aged for 7 hours at 63° C. Thus obtained emulsion is filtered with #400 wire gauge. This emulsion contains 37.5 weight % non-volatile matter and the viscosity of the emulsion was 2.2 poise.

COMPARATIVE EXAMPLE 1

According to the same procedure of the Example 1, the uniform solution (a) is obtained.

| | |
|---|---|
| (1) deionized water | 1,300 g |
| (2) Neocall p (anion surface active agent) | 33 g |
| (manufactured by DAIICHI KOGYO SEIYAKU CO., LTD.) | |
| (3) Na-persulphate | 55 g |

Above (2) and (3) are added to (1) to obtain a uniform and transparent water solution (c) which is put in a 4-necked flask equipped with dropping funnel containing water solution (a). More specifically, in a 4-necked 2 l flask equipped with dropping funnel, water solution (c) is added after the air in the system is replaced entirely with $N_2$ and the temperature in the system is raised to 63° C. while the system is stirred. The solution in the dropping funnel is dropped uniformly into the 4-necked flask for 3 hours, and after being aged for 73 hours at 63° C. the solution is filtered with #400 wire gauge and an emulsion is obtained.

EXAMPLES 2~10

According to the same procedure and conditions used in Example 1, the emulsion is made by changing the kind of used monomer mixture and the kind and the charged amount of chlorinated polyolefin only, as summarized in Table 1, and the properties of the coatings are summarized in Table 2.

COMPARATIVE EXAMPLES 2~10

According to the same procedure and conditions used in the Comparative Example 1, the emulsions are made by changing the kind of monomer mixture and the kind and charged amount of chlorinated polyolefins only, as summarized in Table 1.

TABLE 1

| | | Cl-po (2) | | Oligomer | | Emulsion | | |
|---|---|---|---|---|---|---|---|---|
| Exp. No. | Comp. of monomer (1) | Kind | Charged amount | Kind | Charged amount (4) (g) | App. (4) | Rm. Temp Stability | Solid Matter (%) |
| E 1 | EH 100% | 14 LWP | 200 g | AW6S | 110 g | ○ | Over 3 | 37.5 |
| CE 1 | Same as 1 | " | " | " | " | PHS | — | — |
| E 2 | EN/IB = 50/50 | " | " | " | " | ○ | Over 3 | 38.0 |
| CE 2 | Same as 2 | " | " | " | " | PHS | — | — |
| E 3 | EH/M = 50/50 | " | " | " | " | ○ | Over 3 | 37.7 |
| CE 3 | Same as 3 | " | " | " | " | PHS | — | — |
| E 4 | EH 100 | " | 100 g | " | " | ○ | Over 3 | 38.8 |
| CE 4 | Same as 4 | " | " | " | " | PHS | — | — |
| E 5 | Same as 4 | 13LLBP | 200 g | " | " | ○ | Over 3 | 37.8 |
| Ce 5 | Same as 4 | " | " | " | " | PHS | — | — |

TABLE 1-continued

| Exp. No. | Comp. of monomer (1) | Cl-po (2) Kind | Charged amount | Oligomer Kind | Charged amount (4) (g) | App. (4) | Rm. Temp Stabi-lity | Solid Matter (%) |
|---|---|---|---|---|---|---|---|---|
| E 6 | Same as 4 | 16-LP | " | PM 3 | " | ○ | Over 3 | 38.1 |
| CE 6 | Same as 4 | " | " | " | " | PHS | — | — |
| E 7 | EH/St = 50/50 | " | " | " | " | ○ | Over 3 | 37.9 |
| CE 7 | Same as 7 | " | " | " | " | PHS | — | — |
| E 8 | IB/M = 20/80 | " | " | AW6S | 170 g | ○ | Over 3 | 38.5 |
| CE 8 | Same as 8 | " | " | " | " | PHS | — | — |
| E 9 | Same as 8 | RS-40P | " | " | 200 g | ○ | Over 3 | 43.8 |
| CE 9 | Same as 8 | " | " | " | " | PHS | — | — |
| E 10 | Same as 8 | " | " | " | " | ○ | Over 3 | 38.2 |
| CE 10 | Same as 8 | " | " | " | " | PHS | — | — |

Explanation of Table 1:
(1) EH: 2 ethylhexylmethacrylate
IB: isobutylmethacrylate
M: methylmethacrylate
St: styrene
In each case, charged methacrylic acid is 17 g.
(2) the column (Cl-po)
13-LLBP: Chlorinated polypropylene (Cl content = 27.0%)
16-LP: Chlorinated polypropylene (Cl content = 32.1%)
RS-40P: Chlorinated polypropylene (Cl content = 40.2%)
(All manufactured by TOYO KASEI KOGYO CO., LTD.)
(3) PM-3 Polycaprolactone modified 2-ethylhexylmethacrylate (Manufactured by CAICEL CHEMICAL CO., LTD.)
(4) The value is converted on the basis of the solid resin.
○ = No phase separation
PHS = Phase separation
E = Experiment
CE = Comparative Experiment
App. = Appearance
Rm. Temp = Room Temperature
Exp. = Experiment
Over 3 = Over 3 hours

TABLE 2

| | Properties of Primer Coating Film (1) | | | Properties of One Coating Film (2) | | | |
|---|---|---|---|---|---|---|---|
| Experiment No. | Adhesion Property (1) | Waterproof Property (2) | Gasolineproof Property (3) | Adhesion Property | Waterproof Property | Gasolineproof Property | Weatherproof Property |
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 6 | 0 | 0 | 0 | 0 | 0 | 0 | 0 |
| 7 | 0 | 0 | 0 | 0 | 0 | 0 | 0 |
| 8 | 0 | 0 | 0 | 0 | · 0 | 0 | 0 |
| 9 | 0 | 0 | 0 | 0 | 0 | 0 | 0 |
| 10 | 0 | 0 | 0 | 0 | 0 | 0 | 0 |

0 = Good
Explanation (1) and (2) of the Table 2:
(1) The emulsion having its concentration regulated with water is sprayed on a polypropylene material so its coating amount is 3 ± 1 g/m² and baked for 1 hour at 100° C. to obtain a base layer (which is named the primer). As the top coat, urethane coating pG80 (manufactured by KANSAI PAINT CO., LTD.) having its concentration regulated by blending 25 weight % RETAN pG hardener for plastics (manufactured by said company) to 100 weight % urethane coating is used. The concentration of the top coat is regulated by using thinner, and the product is sprayed on the primer so its concentration is 50 g/m² and the product is baked at 100° C. for 1 hour to make test pieces which are kept for one week at room temperature and used for the test.
(2) Emulsion of the present invention is a blend of 50 weight parts emulsion - Acryset EMN-210E (manufactured by NIHON SHOKUBAI CO., LTD.) for 100 weight parts emulsion of the present invention regulated in concentration with water and sprayed on the polypropylene material as in (1) so its coating amount is 50 ± 5 g/m² and baked at 100° C. for one hour after which it is kept for 1 week at room temperature and is used for the test.

Test Method (1) Adhesive Property:
Polypropylene (natural) is used as the substrate (manufactured by NIKKO CO., LTD.) in accordance with the method of JIS K5400, X-Cut Tape Test.

(2) Waterproof Test:
Polypropylene plate which is coated with the solution of the present invention is dipped in 30° C. hot water for 25 hours and is examined for the appearance of the coated film, to determine the degree of damage of the appearance.

(3) Gasolineproof Test:
Surface of the coated film is rubbed 30 times with gasoline (regular gasoline manufactured by IDE-MITSU CO., LTD.) soaked absorbent cotton and is examined for the appearance of the coated film.

(4) Weatherproof Test:
Sample of emulsion is coated on the surface of an acrylic resin plate which is set at a 45° angle of elevation and is exposed for one year to the southern direction, and is tested for the grade of coloring and luster.

Effect of the Invention

The effect of the present invention is summarized as follows:

Emulsion of the synthetic resin composites has the following merits:

(1) The present invention does not cause a bad influence or harm to the public and is obtained as a stable chlorinated polyolefin type product.
(2) The present invention exhibits good adhesion to synthetic resins, for example, polypropylene materials, etc.
(3) The present invention is preserved in safety more than 3 months at room temperature.
(4) Moldings or films of the polyolefin system are coated or covered by the present invention from the room temperature range to 160° C. and dried, and so by one coat finishing, a coating film or primer can be obtained without pollution.
(5) Above mentioned coating films have various excellent properties, e.g. good adhesion, solvent-proof, and weatherproof properties.

What is claimed is:

1. A method of manufacturing an emulsion which comprises copolymerizing, in an aqueous medium, optionally in the presence of a catalyst, a chain transfer moderator or both the catalyst and moderator, the following components:

(a) one or more chlorinated polyolefins containing from 5 to 70 weight % chlorine,
   (b) one or more acrylic or methacrylic acid monomers which have the ability to dissolve (a), and
   (c) one or more acrylate or methacrylate oligomers selected from the group consisting of macromers and macromonomers which have a molecular weight from several hundred to ten thousands and which have a double bond at at least one terminal of their molecule or have a hydroxyl or carboxyl radical at both terminals of the molecule.

2. A method according to claim 1, wherein the chlorinated polyolefin (a), the monomer (b) and the oligomer (c) are copolymerized in suspension in an aqueous medium by using, as a dispersing agent, one or more natural organic polymers or their derivatives, water-soluble organic synthetic polymers or their derivatives, sparingly soluble fine powders of inorganic compounds, or one or more metals or metal oxides.

3. A method according to claim 1, wherein the polymerization is suspension polymerization of the chlorinated polyolefin (a), the monomer (b) and the oligomer (c) in water, and wherein one or more anionic or nonionic surface active agents are used with a dispersing agent, or the suspension polymerization of (a), (b) and (c) is achieved mechanically by using a homogenizer.

4. A method according to claim 3, wherein the suspension polymerization is conducted in the presence of anionic and nonionic surface active agents which have different HLB values from each other.

* * * * *